(12) United States Patent
Desai

(10) Patent No.: US 7,468,860 B1
(45) Date of Patent: Dec. 23, 2008

(54) HOOK AND LOOP DEVICE APPLIED TO CONTROL SHOCK AND VIBRATION OF CRITICAL COMPONENTS

(76) Inventor: Shrikant M. Desai, 743 Polaris Way, Livermore, CA (US) 94550

( * ) Notice: Subject to any disclaimer, the term of this patent is extended or adjusted under 35 U.S.C. 154(b) by 352 days.

(21) Appl. No.: 10/906,970

(22) Filed: Mar. 14, 2005

Related U.S. Application Data

(60) Provisional application No. 60/554,414, filed on Mar. 19, 2004.

(51) Int. Cl.
*G11B 33/14* (2006.01)
(52) U.S. Cl. .................................. 360/97.02
(58) Field of Classification Search ....................... None
See application file for complete search history.

(56) References Cited

U.S. PATENT DOCUMENTS

| | | | |
|---|---|---|---|
| 2,717,437 A | 9/1955 | De Mestral | |
| 3,384,221 A | 5/1968 | Houtman | |
| 4,491,888 A * | 1/1985 | Brown et al. | 360/97.03 |
| 4,568,988 A | 2/1986 | McGinlay et al. | |
| 4,638,383 A | 1/1987 | McGinlay et al. | |
| 4,750,443 A * | 6/1988 | Blaustein et al. | 112/420 |
| 4,796,849 A | 1/1989 | Fouassier | |
| 4,891,734 A | 1/1990 | More et al. | |
| 5,214,549 A * | 5/1993 | Baker et al. | 360/97.02 |
| 5,216,582 A | 6/1993 | Russell et al. | |
| 5,436,051 A * | 7/1995 | Donaruma et al. | 428/95 |
| 5,469,311 A * | 11/1995 | Nishida et al. | 360/97.02 |
| 5,510,954 A | 4/1996 | Wyler | |
| 5,546,250 A | 8/1996 | Diel | |
| 5,656,351 A | 8/1997 | Donaruma | |
| 5,677,813 A * | 10/1997 | Yoshida et al. | 360/97.02 |
| 5,739,463 A | 4/1998 | Diaz et al. | |
| 5,837,934 A * | 11/1998 | Valavanis et al. | 174/52.1 |
| 5,858,509 A * | 1/1999 | Polch et al. | 428/166 |
| 5,915,556 A | 6/1999 | Simpson | |
| 5,965,249 A | 10/1999 | Sutton et al. | |
| 5,995,365 A | 11/1999 | Broder et al. | |
| 6,039,299 A | 3/2000 | Ohnishi et al. | |
| 6,052,255 A * | 4/2000 | Kawabe et al. | 360/97.02 |
| 6,080,347 A | 6/2000 | Goulait | |
| 6,131,734 A * | 10/2000 | Hollingsworth et al. | 206/320 |
| 6,154,360 A | 11/2000 | Kaczeus, Sr. et al. | |
| 6,249,432 B1 | 6/2001 | Gamble et al. | |
| 6,339,532 B1 | 1/2002 | Boulay et al. | |
| 6,347,411 B1 | 2/2002 | Darling | |
| 6,351,374 B1 | 2/2002 | Sherry | |
| 6,377,420 B1 * | 4/2002 | Tadepalli et al. | 360/97.02 |
| 6,489,004 B1 | 12/2002 | Martin et al. | |
| 6,574,099 B2 * | 6/2003 | Lindrose | 361/685 |
| 6,645,600 B2 | 11/2003 | Martin et al. | |
| 6,647,600 B1 | 11/2003 | Jost et al. | |
| 6,791,799 B2 | 9/2004 | Fletcher | |
| D499,423 S | 12/2004 | Bahroocha et al. | |
| 2001/0048571 A1 * | 12/2001 | Boutaghou | 360/97.02 |
| 2003/0054130 A1 | 3/2003 | Martin et al. | |
| 2004/0166282 A1 | 8/2004 | Kingsford et al. | |
| 2005/0013107 A1 | 1/2005 | Desai et al. | |

\* cited by examiner

*Primary Examiner*—David D Davis
(74) *Attorney, Agent, or Firm*—Hodgson Russ LLP

(57) ABSTRACT

A hook and loop device protects electronics, such as hard disk drives, from shocks and vibrations. The electronics are disposed within a housing and coupled to the housing via a hook and loop device that reduces shocks and vibrations.

10 Claims, 13 Drawing Sheets

HOOK AND LOOP DEVICE APPLIED TO CONTROL SHOCK AND VIBRATION OF CRITICAL COMPONENTS

CROSS-REFERENCE TO RELATED APPLICATION

This application claims benefit of and incorporates by reference, U.S. Patent Application No. 60/554,414 entitled "Hook & loop device applied to control shock and vibration of critical components" by inventor Shrikant M. Desai and filed on Mar. 19, 2004.

FIELD OF THE INVENTION

The invention generally relates to control of shock and vibration of critical objects such as electrical systems and devices. More specifically, the invention relates to a housing or mounting assembly with diverse electrical and electromechanical components, especially to electronic systems and devices. The invention relates to methods and apparatus for cushioning of a computer peripheral from mechanical shocks and vibrations, especially a memory unit peripheral such as a disk drive. The method and apparatus employ a device, such as Velcro, with hook and loop mechanical structures that dissipate mechanical energy primarily by Coulomb Friction due to rubbing of these structures during relative motion.

BACKGROUND

The term "disk drives" may refer to any of several types of devices, including but not limited to hard disk drives, floppy disk drives, and optical disk drives such as CD and DVD drives. These disk drives share a common characteristic of having one or more rotating recording media disks, and having a transducer positioned over a surface of the media. Disk drives also share the characteristic of being highly susceptible to damage, in part due to external shock and vibration and in another part due to internally generated vibrations that are not sufficiently damped by the disk drive mounting.

A drive using fixed rotating disks inside it is called a fixed disk drive. A drive using removable disks enclosed in an envelope is called a removable disk drive and the envelope containing the disks is called a removable disk cartridge. When the fixed disk drive itself is enclosed in an envelope and a shock resistant system is placed between them, then this assembly is called a removable drive module. A removable disk cartridge is removable from a disk drive while a removable drive module is removable from a docking device installed in a computer or an array chassis. Examples of removable disk cartridges include both industry standard 3.5" floppy disk cartridges supplied by many manufacturers and removable hard disk cartridges supplied by companies such as Iomega, Castlewood and SyQuest. DataZone Corporation supplied a prior art removable drive module under the trademark DataBook. Olixir Technologies supplies a drive module under the trademark DataVault. A drive module can utilize an optical disk drive, a tape drive and other such drives besides hard, magnetic disk drives.

One application of the present invention relates to portable audio/video players technology using a Hard Disk Drive to store digital information. A music player is one such device. An "Ipod" made by Apple Computer and a "Zen" made by Creative Labs are examples of such music players. In known prior art, foam, polymeric material, viscous fluids, mechanical springs or a combination of these materials and devices provide shock and vibration protection to a disk drive. The following patents show state-of-the-art damping schemes. However, these fall short of achieving shock protection for a drop of more than 20 inches on a hard surface. The present invention overcomes this limitation.

Prior art includes United States Patent Application Publication 2005/0013107 A1 of Jan. 20, 2005 by Desai et al. This application presents a device utilizing a viscous fluid and describes earlier prior art relevant for shock protection of a hard disk drive in a removable module. The U.S. Pat. No. 6,351,374 to Sherry; U.S. Pat. No. 6,249,432 to Gamble et al.; U.S. Pat. No. 6,154,360 to Kaczeus Sr. et al.; U.S. Pat. No. 5,837,934 to Valavanis et al.; U.S. Pat. Nos. 4,638,383 and 4,568,988 to McGinlay et al., and U.S. Pat. No. 3,384,221 to Houtman provide limited teachings that refer only to foam materials, which do not achieve the desired degree of protection.

United States Patent Application 2005/0013107 A1 of Jan. 20, 2005 by Desai et al. is assigned to Olixir Technologies. It describes a mechanical energy dissipative element, MEDE, containing open cell foam, a viscous fluid and a compressible gas in a sealed flexible envelope. This device is capable of handling the drop requirement. However, the presence of a viscous fluid portends a possibility of leakage should the envelope gets punctured.

U.S. Pat. No. 6,154,360 to Kaczeus, Sr., et al. is assigned to DataZone Corporation. It shows a data storage subsystem that is capable of withstanding rough handling by partially surrounding a hard disk drive with a specially configured foam enclosure, formed, for example, of polyurethane foam.

U.S. Pat. No. 6,249,432 to Gamble et al. discloses a removable hard disk drive mounted in a carrier or tray for insertion into a docking bay. A three-component vibration damping system incorporating a polymeric material reduces vibration reaching the hard disk drive. This patent relates only to disk drives and not to general packaging and protecting of objects and systems.

U.S. Pat. No. 6,351,374 to Sherry discloses a hard disk drive module which uses insulator foam or other resilient material on one side or edge of the unit so as to maintain engagement with the other side or edge of a modular case. The resilient material can reduce shock to the disk drive unit due to impact on either the case or the chassis. Even a flexible cable leading to an electrical connector is attributed with the qualities of a shock absorber. This patent teaches a degree of shock absorption, but the extent of shock absorption appears to be low.

U.S. Pat. No. 5,837,934 to Valavanis et al. presents the use of foam sheets to provide shock absorption. It neither anticipates nor suggests applications for protecting other objects, systems, or devices by use of hook and loop device techniques.

U.S. Pat. Nos. 4,638,383 and 4,568,988 to McGinlay et al. provide a prior art disk drive design. These patents teach an anti-vibration mount using an elastic rubber material with very limited shock absorption capability.

U.S. Pat. No. 3,384,221 to Houtman claims the invention of adding a plurality of fingers or cuts in foam padding used for shock protection. A package can be dropped from a maximum height of 30 inches. Transmitted shock may be to reduced 11 Gs. However, this patent neither suggests nor discloses the use of any hook and loop device techniques for shock or vibration damping.

Additional prior art includes U.S. Pat. No. 6,347,411 to Darling; U.S. Pat. No. 6,339,532 to Boulay et al.; U.S. Pat. No. 6,039,299 to Ohnishi et al.; U.S. Pat. No. 5,995,365 to Broder et al.; U.S. Pat. No. 5,965,249 to Sutton et al.; and U.S.

Pat. No. 5,510,954 to Wyler. These patents mention the use of viscous materials but not hook and loop device techniques.

U.S. Pat. No. 6,339,532 to Boulay et al. discloses mounting a disk drive by a layer of viscoelastic material, it does not anticipate the methods and apparatus used in the present invention.

U.S. Pat. No. 6,039,299 to Ohnishi, et al. discloses a viscous damper for a disk-reproducing unit, which is not subject to the shock danger encountered by a portable device.

U.S. Pat. No. 5,995,365 to Broder, et al. teaches the use of flexible cables to reduce the transfer of shock forces among electronic components such as a motherboard and a hard drive-carrier assembly. The Broder patent also teaches a method of using articulated arms as shock absorbers.

U.S. Pat. No. 5,965,249 to Sutton, et al. teaches a cold flowing material with high internal cohesion forces. It does not envision the methods and apparatus of the present invention.

U.S. Pat. No. 5,510,954 to Wyler teaches acoustic shielding. A key element is a fluid impervious barrier layer located next to sound absorptive porous foam. The acoustic shielding employs no hook and loop device techniques of the present invention.

Various other patents show background art. U.S. Pat. No. 5,546,250 to Diel uses an elastomer seal to cover the frame of a drive and absorb external loads applied to the edges of the housing. The protection system is applied to a disk drive perimeter rather than to a module. U.S. Pat. No. 4,891,734 to More et al. shows the use of an elastomer body to encapsulate an electronic assembly that is confined in a closed cavity of a structure subject to vibration and shock. U.S. Pat. No. 5,216,582 to Russell et al. describes a housing assembly that forms a fixed disk drive module for a low profile fixed disk drive that is shock-mounted therein. Both More and Russell use elastomer supports to protect from shock and vibration.

Some examples of the available technology in storage products are the music players by Apple Computer and Archos, and the XT 5000 external hard drive by Maxtor. These products use viscoelastic materials to absorb shock.

The above prior art analysis contrasts the essential or often occurring elements of certain embodiments of the present innovation. The present invention comprises additional embodiments that may or may not include all the elements listed above. All observations provided herein are directed to optional aspects of the present invention and are in no way expressions of limitations to the full scope of the present invention.

Portable Data Storage—A minimum requirement for portability of disk drives is the ability to survive multiple drops, from a height of more than two feet onto a hard surface, without damage to the drive. The present innovation helps meet this requirement Removable media can meet the minimum shock requirement for portability. Iomega, SyQuest and Castlewood have shipped hard disk drive devices using removable media. The hard disk is contained in a cartridge that is removable from the drive. This makes for data portability. The inherent problem with removable media for hard disk drives is that the media becomes contaminated and this contamination transfers to the transducer in the drive. To counter the effects of the contamination, the recording capacity of the media is relatively decreased and the reliability of the overall system is compromised.

Floppy disk, CD, and DVD are other removable media. These media are much less susceptible to contamination. However, the capacity of the recording media is 0.01% to 1.0% of the capacity of a comparable size hard disk drive. These low capacities limit the application and usefulness of the removable media disk drives. In addition, the large numbers of floppy disks, CDs, and DVDs, which are often needed and used, require a large and carefully cataloged library. This same information is better stored on a single hard disk drive that has electronic means for cataloging.

Shipments of Disk Drives—There are design standards for common carrier shipments based upon size and weight of a container and whether the package is shipped on or off a pallet. Special shipping containers have to be designed to protect all shipments of disk drives. A percentage of common carrier shipments experience shocks in excess of the design standards, resulting in costly damage and possible loss of data. Individual disk drives are shipped in expensive and bulky boxes lined with foam or other bulky, shock absorbing, paper based material.

Environmental concerns and new laws require recycling of packing materials. Foam and other polymeric materials are extremely difficult to recycle. Secondary shipment costs of these packaging materials are high because they have to be used in large volumes for adequate protection of delicate peripherals or instruments.

There is a need for a disk drive cartridge that can withstand high G-shock for shipment by common carriers, eliminating the need for the design of special and expensive shipping containers.

Athletes and military personnel require helmets to protect them from head injuries. Presently, foam in a plastic or metal shell is used to construct a helmet. A better technology is needed to resist heavier shocks due to impacts received in the field.

Disk Drive Mounting—Whether the hard disk drive is mounted as a single component in a system or as an array of many disk drives, the mounting design is crucial to obtaining optimum performance and enhanced reliability. Previous mounting schemes use foams, polymeric materials, viscoelastic materials, mechanical springs or a combination of these materials and devices to provide the required shock and vibration damping to the disk drive.

These previous mounting schemes either mount the drive to a solid member of a case that incorporates shock and vibration damping material or mount the drive in a cartridge or some type of module having shock and vibration isolation and damping. The cartridge or module is then attached to a solid member of the case, with or without damping materials.

The design requirements for these mounting schemes are becoming more critical because:

1) Disk drive rotational speeds are increasing. Typical rotational speeds for hard disk drives have increased from 5400 rpm to 7200 rpm, with some drives now rotating at 10,000 rpm and 15,000 rpm. Slight imbalances will result in large vibrations and/or large forces that will accelerate component wear and induce damage to the drive(s).

2) Larger dense arrays of disk drives require smaller individual contributions in vibration forces from each individual drive. The drives are all rotating at the same speed. Thus, the probability of exciting natural vibration frequencies between the elements of the array is high.

Building of systems incorporating hard disk drives requires careful handling of each and every hard disk drive. Currently, during the process of removal from the shipping container and installation into a system or system module, there is no significant protection afforded to the hard disk drive. Typically, this operation is done by unskilled labor, worldwide. The largest numbers of hard disk drive failures happen during this installation process.

There is a need for a disk drive container that can both protect the hard disk drive during system assembly and meet the vibration and shock requirements. This is irrespective of whether the system uses a single hard disk drive or an array of disk drives.

To achieve the foregoing and other objects and in accordance with the purpose of the present invention, as embodied and broadly described herein, the method and apparatus of this invention may comprise the following.

SUMMARY OF THE INVENTION

According to embodiments of the invention, a hook and loop device such as Velcro material is used for protecting a hosted device from deleterious effects of mechanical shocks and vibrations.

According to another aspect of the invention, a host module assembly protects a hosted device from shock and vibration. The assembly includes a case, housing, or container suitably configured to receive a hosted device therein and to receive at least one hook and loop device such as Velcro between the hosted device and the case. A hosted device is located within the case. Also, at least one hook and loop device made of material such as Velcro is located between the hosted device and the case.

The hosted device can be a disk drive with a traditionally shaped housing having six surfaces. The case is suitably sized to receive at least one hook and loop device made of material such as Velcro between each of the six surfaces and the case. Correspondingly, there can be six such devices located between the disk drive housing and the case, with at least one surface of the disk drive housing facing the case having such a device. These surfaces may be only partially covered or some surfaces may not be covered at all depending on the requirements of the protection needed. Also, different layers may have different properties, dimensions and shapes. This case can be made of separate parts with different materials and located internally to an outer housing as the preferred embodiment for a music player has.

In the preferred embodiment, the outer housing is configured with grooves at edges and corners to receive rubberized insert material structures in them to act as bumpers to provide additional shock protection. A preferred elastomer material for the inserts is of 60 to 70 dm.

In a specifically desirable embodiment of the invention used in the preferred embodiment, the hosted device is a disk drive and the case is made of two stainless steel parts and two plastic parts providing an enclosure with five surfaces surrounding the disk drive. This case, in turn, is placed firmly in a plastic outer housing made in two halves and with rubberized edges and corners. The resulting structure provides a ruggedized portable disk drive module. The disk drive in the preferred embodiment is of 2.5-inch form factor but it can be selected from 3.5-inch, 3.0-inch, or 1.8-inch or smaller form factor disk drives.

The housing can be adapted for mounting into a computer system, with the result that the hook and loop devices provide the protection from shock and vibration during the installation of the disk drive module into a computer system. Either a single disk drive module or a plurality can be mounted into a computer system. The hook and loop devices, preferably made of off the shelf Velcro material are functional to protect against shock and vibration during the installation of a plurality of the disk drive modules into a dense array of disk drives in a computer system. The housing also may be a shipping container or other transport holder for use in commerce or in handling a disk drive during manufacture or installation, protecting the disk drive from shock and vibration during transportation and handling.

The hosted device can be a portable electronics device besides the music player. Some examples of these are a personal digital assistant (PDA), camera, camcorder, or liquid crystal diode panel.

Another aspect of the invention is a method of dissipating energy released due to external forces that cause deleterious mechanical shocks and vibrations to a disk drive. Placing a number of hook and loop devices around the disk drive carries out the method. A hook and loop fastener device, such as made by VELCRO, consists of a layer of hooks woven on a fabric and a layer of loops woven on another fabric. Together these function as a fastening device in the applications to date in the market. However, such a device in response to an externally applied mechanical force, dissipates mechanical energy coming from this source.

In an embodiment of the invention, a device comprises electronics disposed within a housing, wherein the electronics is coupled to the housing via at least one hook and loop device to minimize shock and vibration of the electronics.

In an embodiment of the invention, a method comprises subjecting a device to an external force, the device comprising electronics disposed within a housing, wherein the electronics is coupled to the housing via at least one hook and loop device to minimize shock and vibration of the electronics; and minimizing transmission of the external force to the electronics via absorption of the associated energy by the hook and loop device.

The accompanying drawings, which are incorporated in and form a part of the specification, illustrate embodiments of the present invention, and together with the description, serve to explain the principles of the invention.

BRIEF DESCRIPTIONS OF THE DRAWINGS

FIGS. 5a, 5b, 5c and 5d show respectively volume/select button 25, screw plug 27, screw 28 and record button 26 used in the assembly of the music player.

Figure 6A:
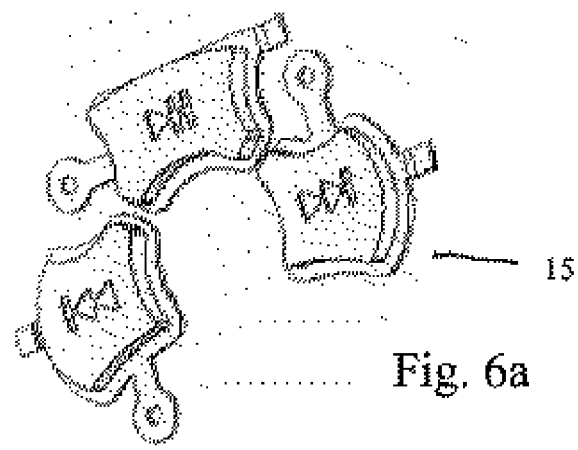
Figure 6B:
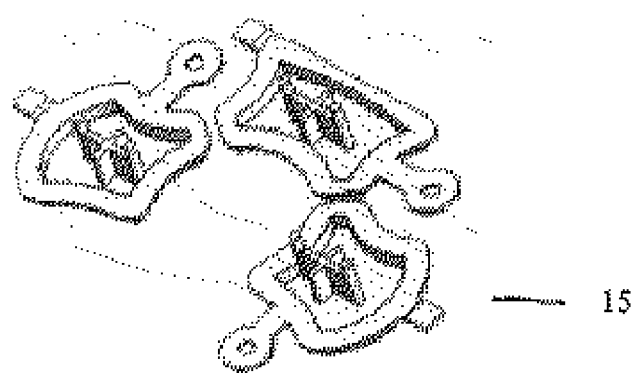

FIGS. 6a and 6b show top and bottom of the front button 15.

Figure 7:
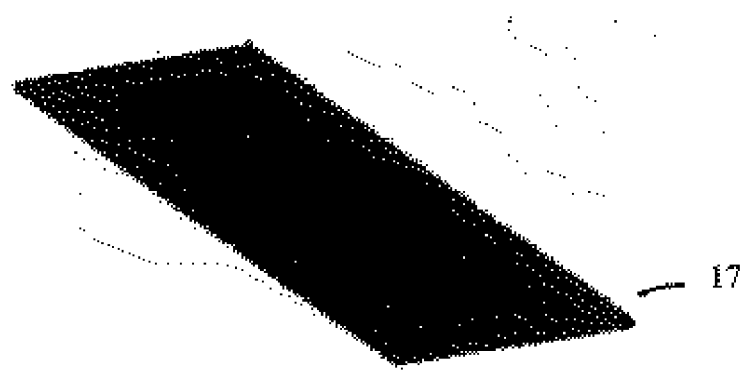

FIG. 7 shows the transparent window 17 fixed to the top case, FIG. 4.

Figure 1:
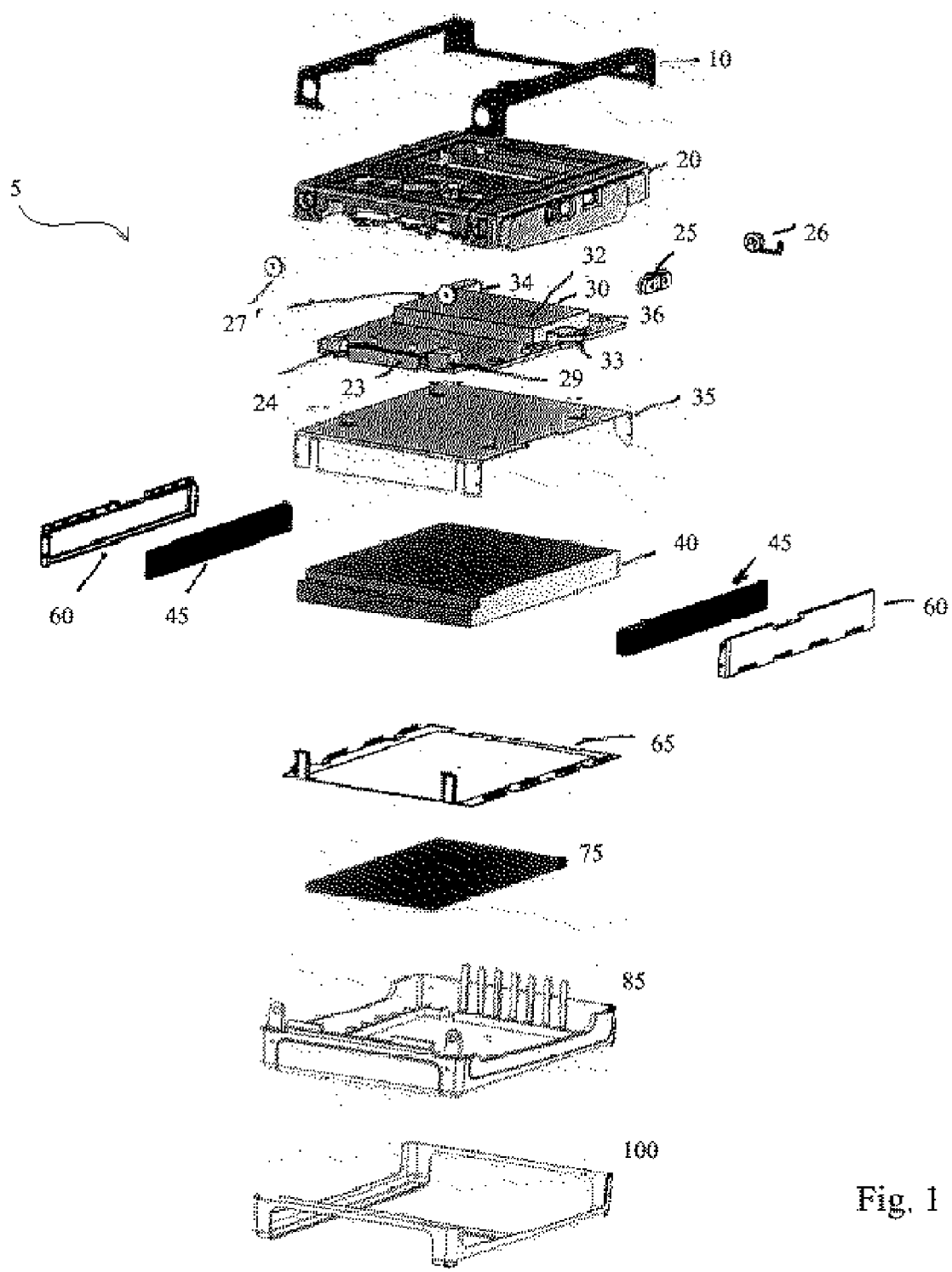
FIG. 1 is an exploded isometric view of a portable music player host module assembly 5 employing hook and loop devices like Velcro which dissipate mechanical energy primarily by Coulomb friction, and including optional components like rubber/elastomer inserts.
Figure 2A:
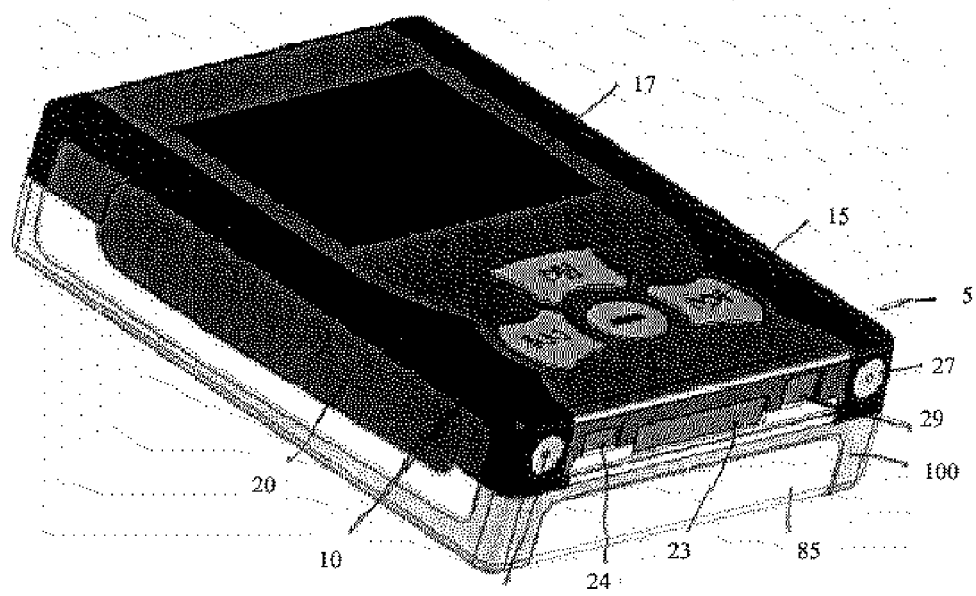
FIG. 2 shows four isometric views of the assembled music player module of FIG. 1.
Figure 2B:
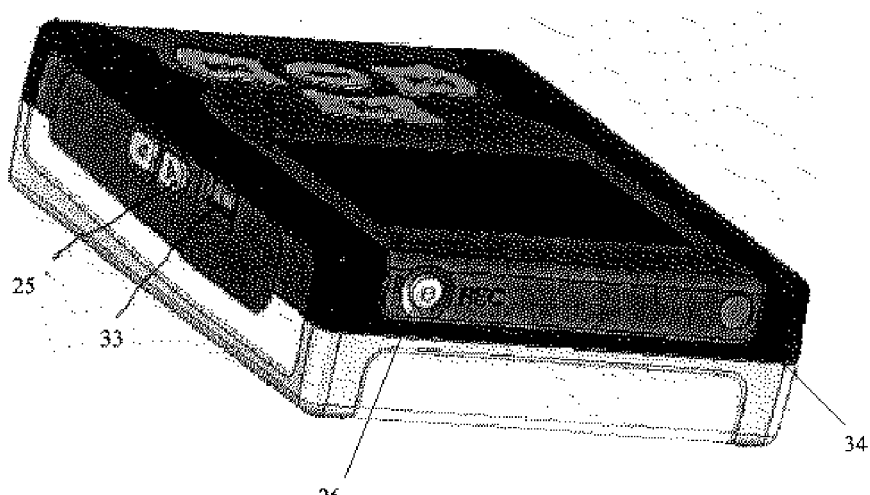
Figure 2C:
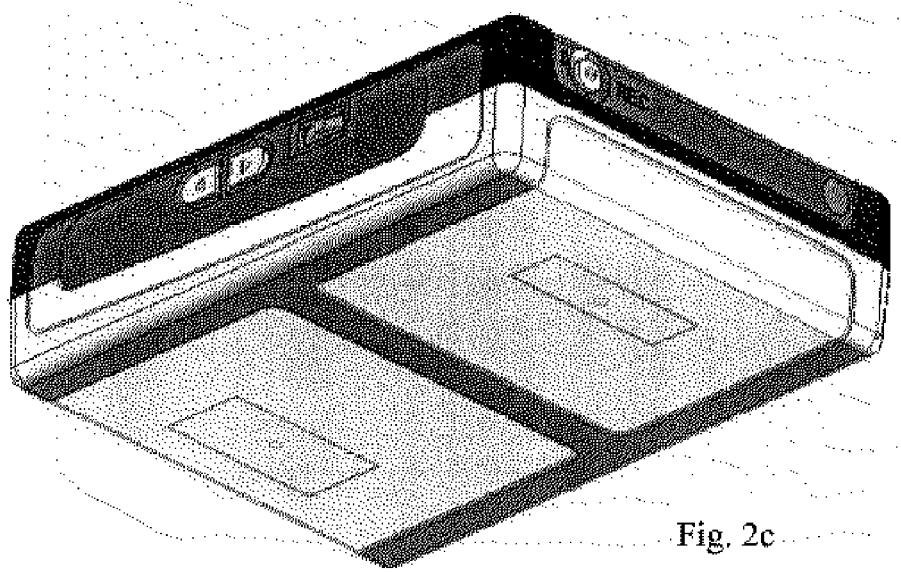
Figure 2D:
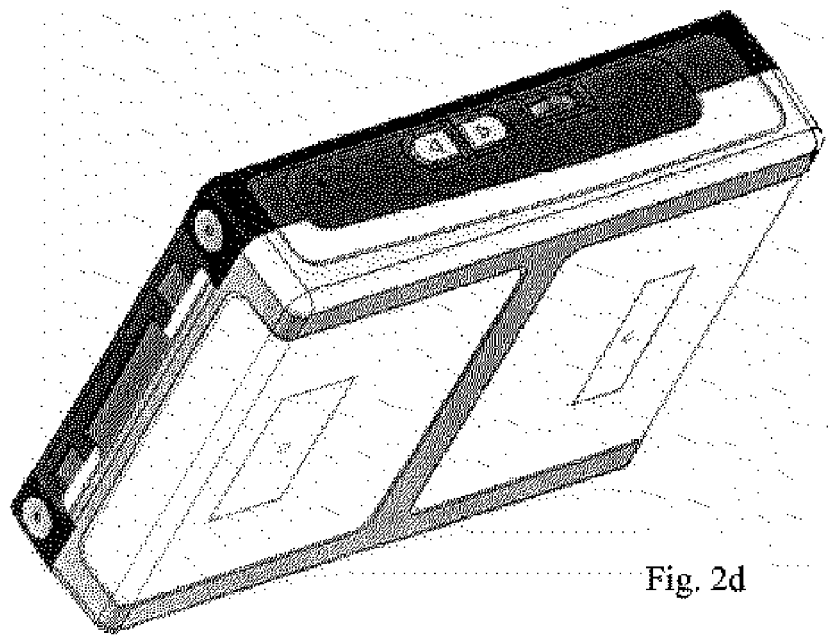
Figure 3A:
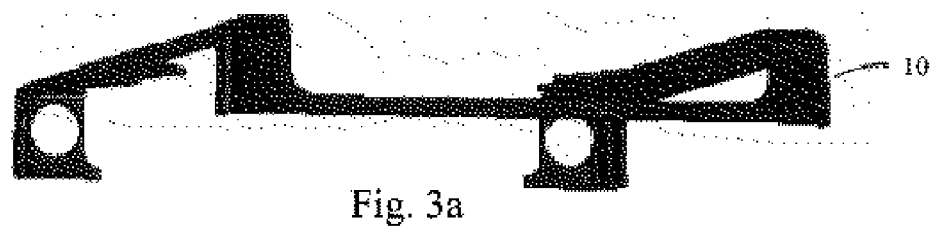
FIG. 3 shows two isometric views, one each for top and bottom rubber/elastomer inserts 10 and 100 of the assembled music player module of FIG. 1.
Figure 3B:
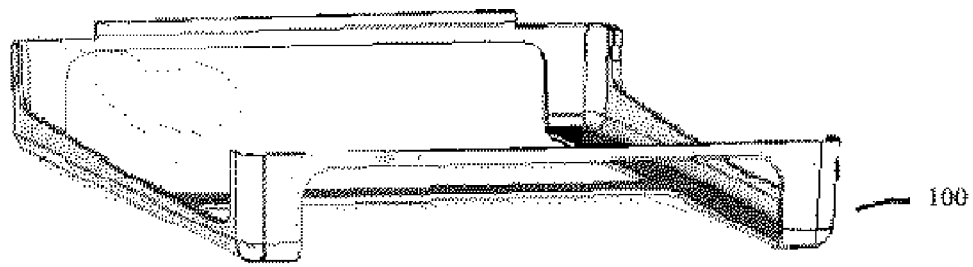
Figure 4A:
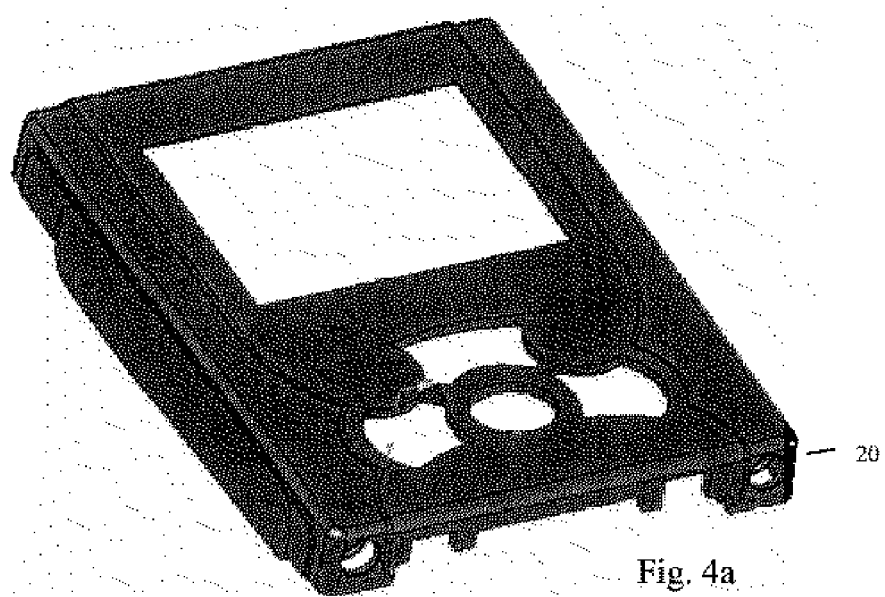
FIG. 4 shows two isometric views of the top case 20 and two isometric views of the bottom case 85 of the exploded assembly, FIG. 1, of the music player.
Figure 4B:
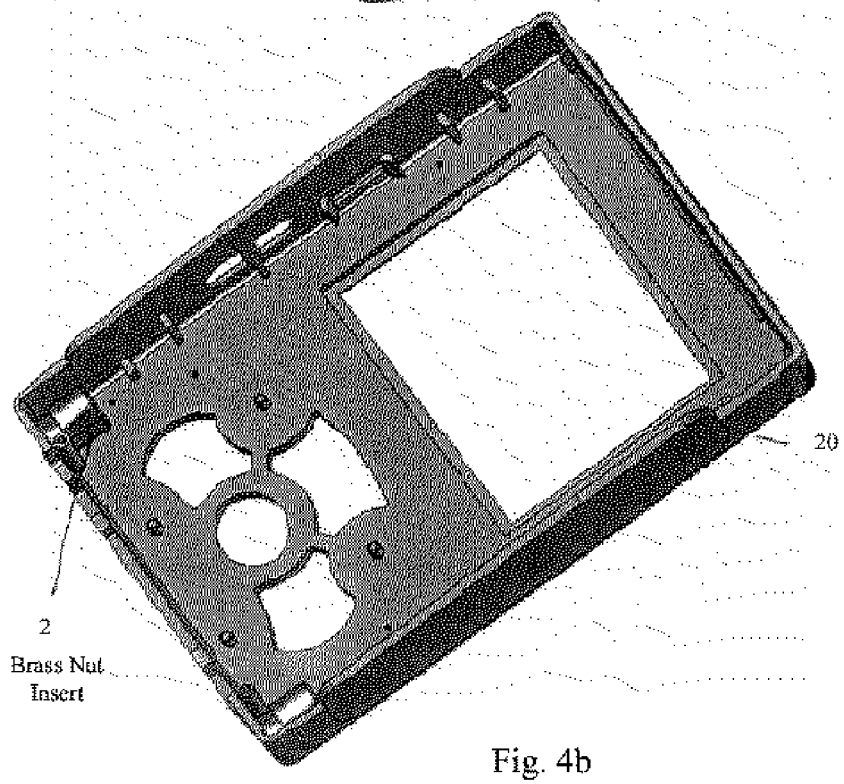
Figure 4C:
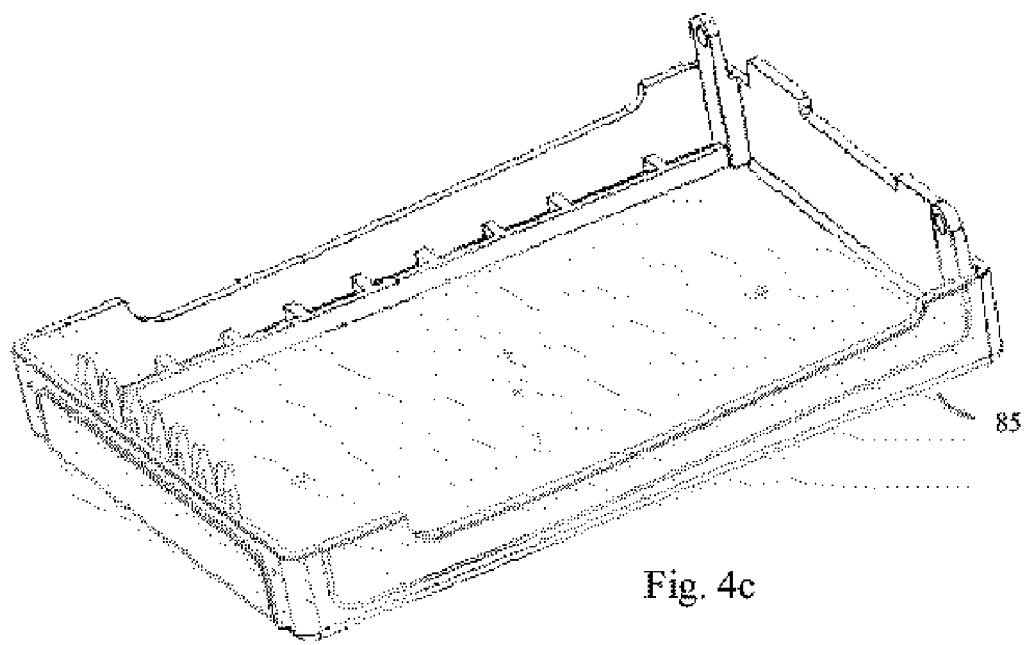
Figure 4D:
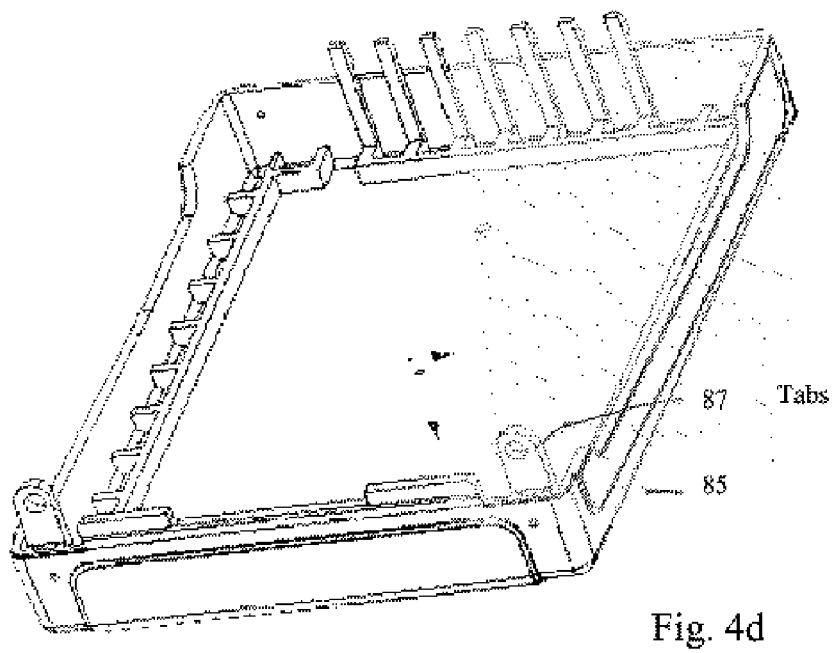
Figure 5A:
Figure 5B:
Figure 5C:
Figure 5D:
Figure 8:
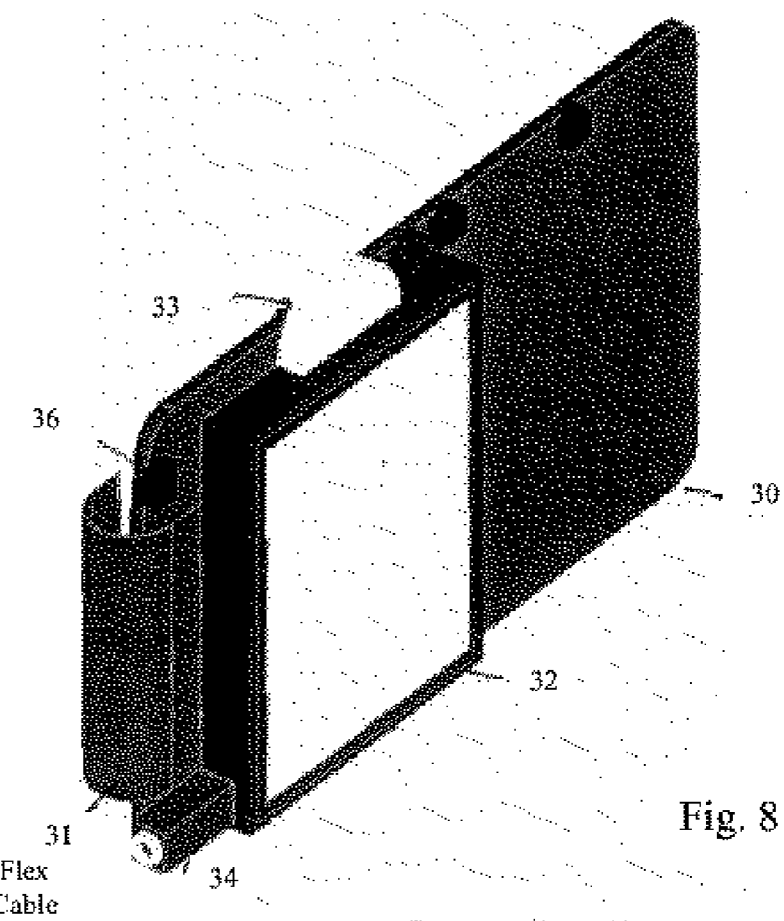

FIG. 8 is an isometric view of the top of the assembled PCB 30 shown in FIG. 1.

Figure 9:
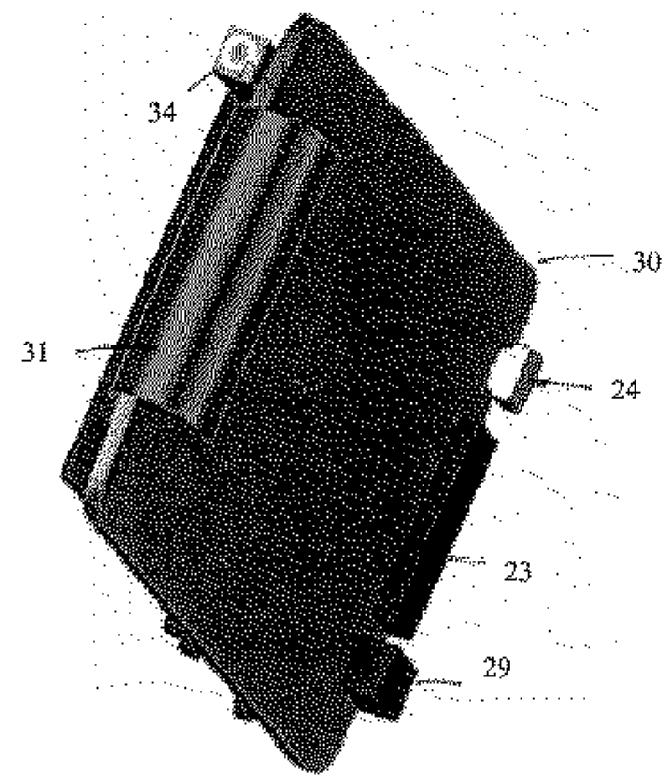

FIG. 9 is an isometric view of the bottom of the assembled PCB shown in FIG. 1.

Figure 10A:
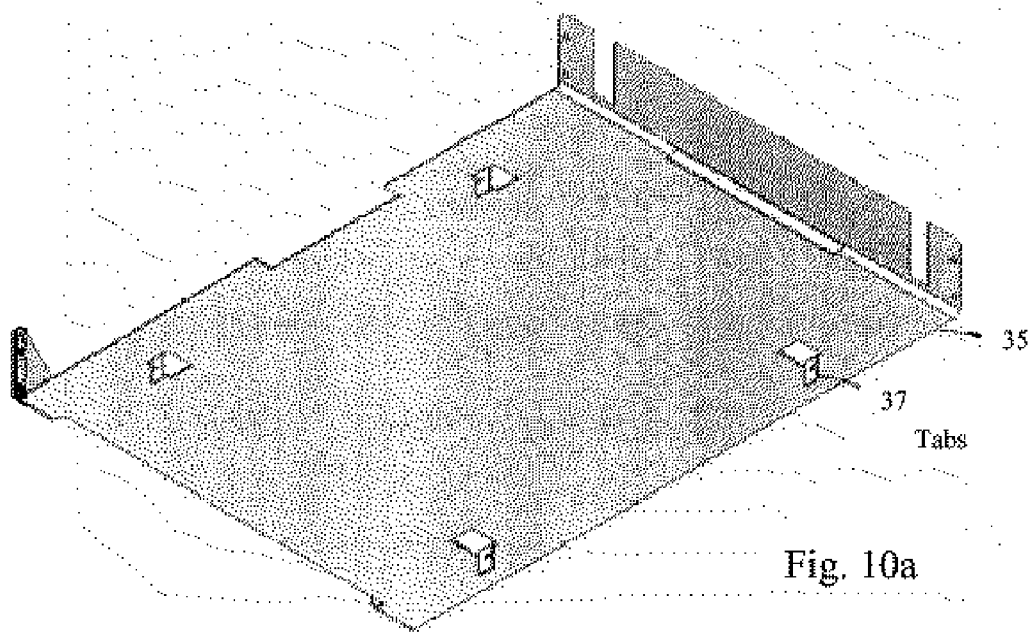
Figure 10B:
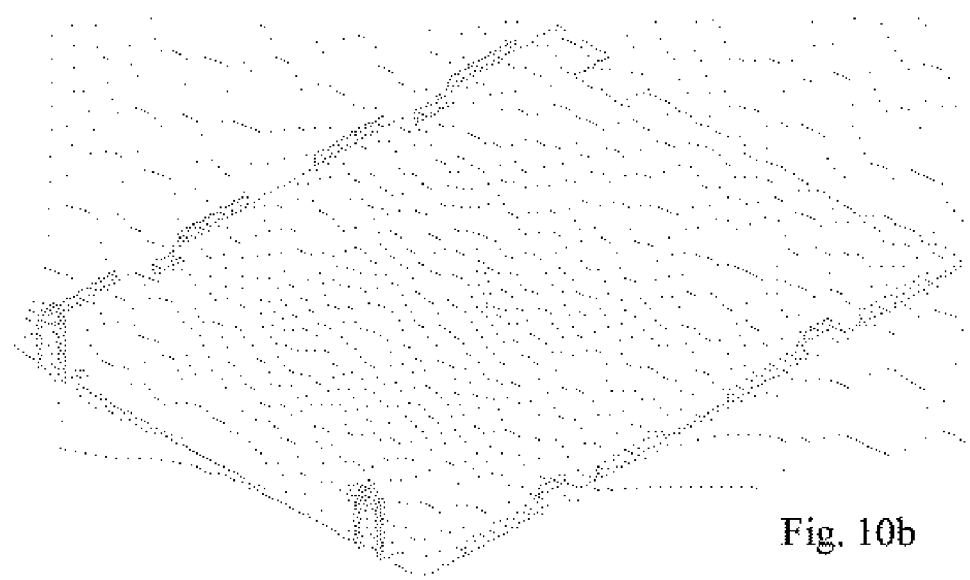

FIGS. 10a and 10b are respectively isometric views of the top and bottom plates 35 and 65 respectively shown in the FIG. 1.

Figure 11A:
Figure 11B:
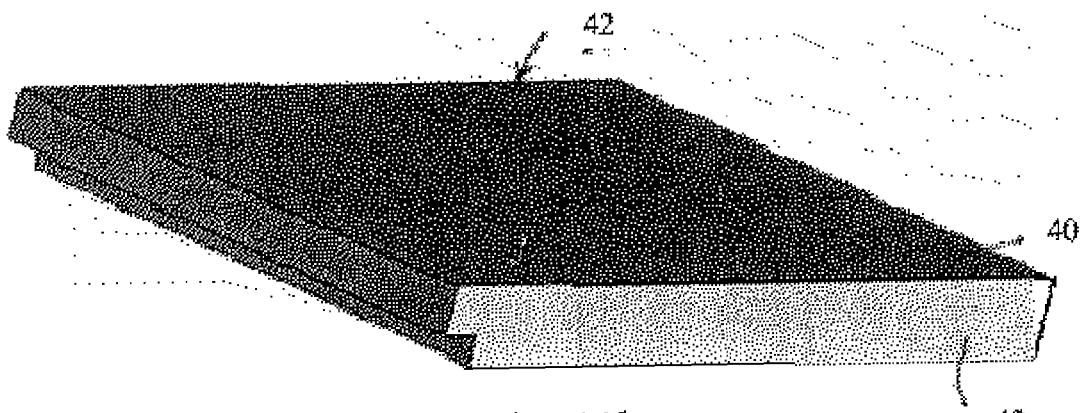

FIGS. 11a and 11b are two views representing a Hard Disk Drive 40.

Figure 12:
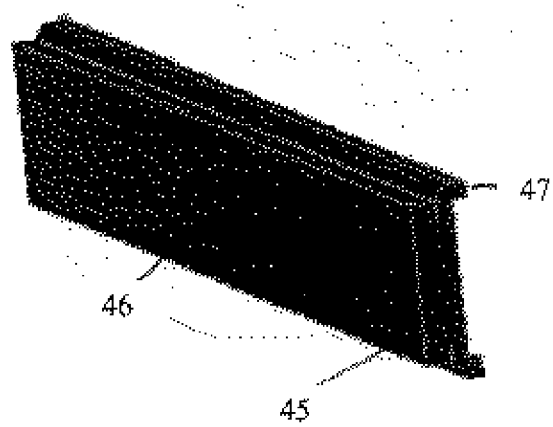

FIG. 12 shows a configured hook and loop device in the form of a strip 45 cut from Velcro material used to configure hook and loop device of FIG. 1.

Figure 13A:
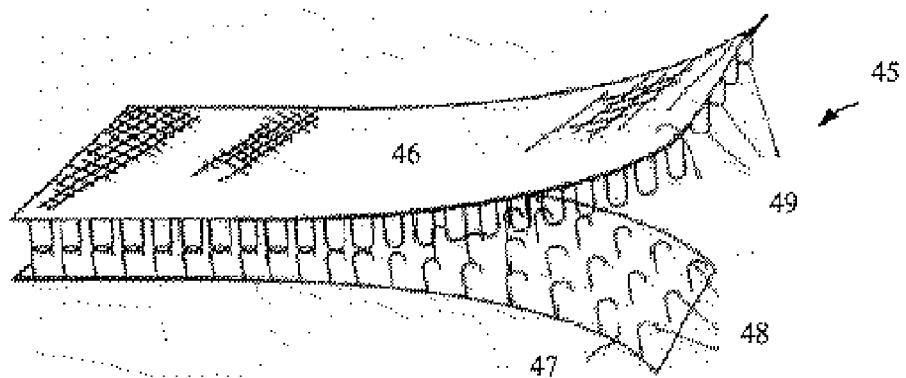
Figure 13B:
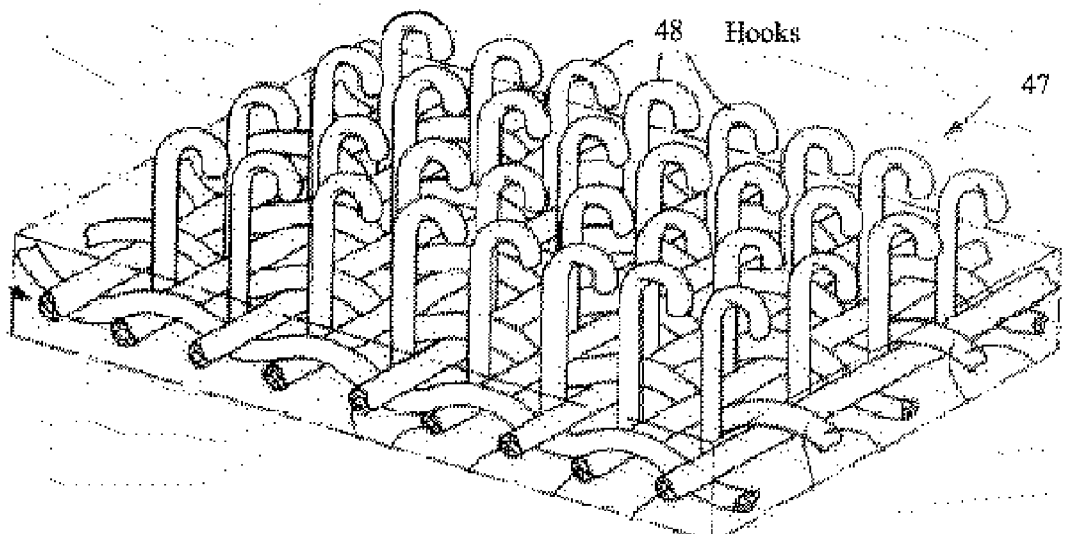
Figure 13C:
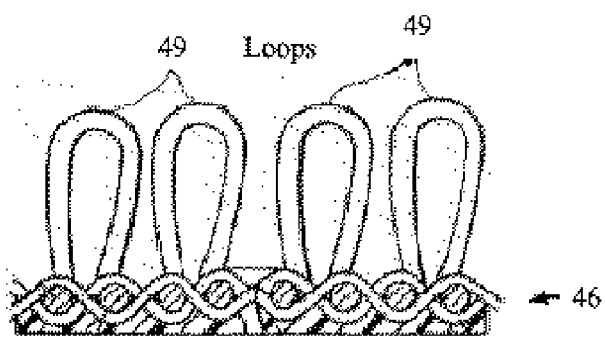

FIGS. 13a, 13b, 13c are detailed view of the construction of a typical hook and loop device 45 made from Velcro material 70.

Figure 14:
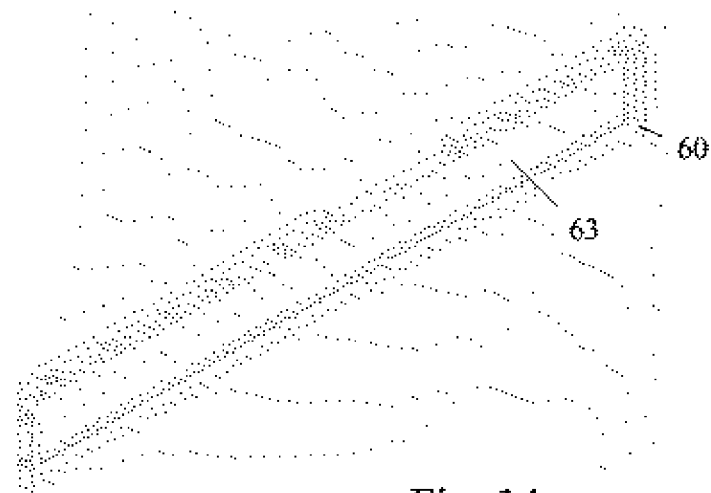

FIG. 14 is an isometric view of a side spacer 60 to which the hook and loop device 45 is attached.

Figure 15:
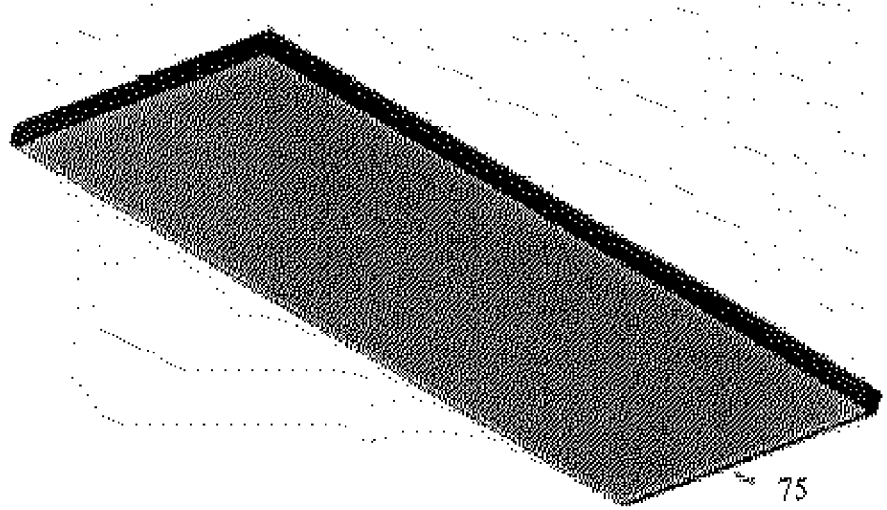

FIG. 15 represents the envelope of a typical battery 75 used in the music player.

DETAILED DESCRIPTION

The invention is an application of a Hook and Loop Device made of a material such as commercially available Velcro to dissipate mechanical energy primarily by Coulomb friction between hooks and corresponding engaging loops in this device. This is useful in protecting a hosted device from many types of mechanical shock and vibration. The Hook and Loop Device, briefly HLD is well suited for use in a portable host module for a hosted device. For example, a fixed disk drive or a removable disk drive is typical hosted devices that may be packaged in a portable housing or casing to create a removable drive module. The HLD can be used between the hosted device and the housing or casing to protect the hosted device. In this application, the HLD enables an expanded range of products to be offered in standard form factors, in which the hosted device must be compactly packaged to fit within dimensionally specified limits.

Protection is possible from shock or vibration in many modes. The Hook and Loop Devices such as those made from Velcro material can protect by reducing external impact shock such as from falls or dropping, by attenuating internal self-exciting vibration forces, by attenuating acoustic energy emanating from the hosted device, or by increasing conductive thermal and/or electrical transport from the hosted device. The Hook and Loop Device provides distributed damping such that if a section of the device is damaged, other sections will still provide damping to reduce shock and vibration. Particularly when the hosted device is a disk drive, it is a significant advantage that a damping structure operates effectively when placed between a disk drive and an encasing module to attenuate internal self-exciting vibration forces emanating from a disk drive. Thus, terms such as shock and vibration refer to end results that may be initiated from any source or cause, including the hosted device, itself, or external events.

Hosted devices are not limited to disk drives. Numerous portable electronics devices may beneficially serve as hosted devices. Common examples include personal digital assistants (PDAs), cameras, camcorders, and liquid crystal diode (LCD) panels. Further, hosted devices need not be portable. Fixed disk drives and other sensitive devices can benefit from protection even when mounted in large or stationary racks, cabinets, cases, and housings. A particularly pertinent example is a collection of similar fixed disk drives as often assembled in a RAID array. However, many types of equipment and devices can benefit by damping inter-equipment effects, whether the devices are of the same type or different types.

A hosted device can be other than electronics. It can be, for example, from sports or military arena. For example, helmet construction can use the present invention technology.

Further, the hosted device need not be in operation or in a functional individual or group mounting. Protection also is necessary during transportation and handling, such as when a hosted device is in a shipping container. The Hook and Loop Devices, HLDs, also can be effective when applied between hosted devices, individually or in modules, and between hosted devices and a shipping container. Each hosted device can be protected both from other hosted devices and from the boxing or crating as may be used during bulk transportation. Also, the Hook and loop devices can protect a hosted device during other phases of handling, such as during installation.

The Hook and Loop Device is a cost-effective means for protecting any disk drive during shipment and installation. In an exemplary embodiment described in greater detail hereinafter, the portable music player is configured to provide maximum protection for a 2.5-inch hard disk drive enclosed in a compact and attractive outer housing. The HLDs provide vibration damping besides shock protection by Coulomb friction. There is no reliance on viscous phenomenon to dissipate the mechanical energy. This permits use of drives with very high rotation speeds in system arrays, which typically generate an increased level of vibration. The music player utilizing a 2.5-inch drive will withstand a shock due to a fall of over 30 inches on a hard surface. Energy dissipation by dry Coulomb friction between the hooks and corresponding engaging loops gives better protection than that obtained by using a single or a combination of foam pads. Moreover, there is no viscous fluid to leak or change properties with environmental conditions. Additionally, intimate physical contact of the material provides improved heat transfer, acoustic damping, and electrical conduction and shielding if needed.

The exemplary embodiment is a portable music layer using a 2.5-inch hard disk drive to store digital data, mostly for music. The player outer housing holds a box structure made of two stainless steel plates and two plastic spacers The spacers are rigidly clamped and held by the outer housing which itself is made of a top case and a bottom case locked together by a finger latch at one end and by two screws at the other end. The top stainless steel (SS) plate supports a PCB with an LCD. There are two small elastomer strips between the top case and the LCD. The bottom SS Plate edges rest on the inside of the bottom case of the outer housing. The disk drive is held by hook and loop devices attached to its long sides and the plastic spacers held rigidly by the housing. The cases are made from shock resistant plastic. This embodiment protects the hard disk drive from shocks due to fall of approximately 30 inches. The internal hard disk drive signal and power connections are applied using a flex PCA cable, flat cable and printed circuit board assembly (PCBA) located on top of the top SS Plate. PCBA output can be connected to various kinds of external interface cables or to a bay or docking device. Power to the stand-alone module is applied via a mini-DIN connector mounted on to the PCBA.

The present invention provides a method and a system that dampens mechanical shock and vibration primarily by means of Coulomb friction between hooks and loops of the Velcro or like material used to suspend and hold the hard disk drive. In this embodiment, the loop or hoop part of each of the HLD device strip is cut and sized to fit and attach to one side of the HDD. The corresponding hook part is sized to fit and attach to the indented rectangular groove in the spacer facing the drive side. The HLD have standard bonding self adhesives.

When mechanical forces, such as those caused by shock, vibration and acoustic waves, act to compress or stretch hook and loop element portions of an the HLDs without separating or peeling them apart, the mechanical energy is dissipated by generation of forces that cause minute relative sliding motions leading to dissipation primarily by Coulomb friction Definition of Coulomb Friction:

Tangential FrictionForce, $F$ on a body = Coefficient of Friction, Mu $x$ Normal Force, $W$ on the body In many applications of the present invention, the hook and loop devices may be attached to more surfaces and not to only two surfaces. The HLDs work in relative motions in translations and rotations involving all three directions.

With reference to the drawings, FIG. 1 shows a portable music player assembly 5 in an exploded view. Main components include a hosted element 40, which may be a disk drive or other shock sensitive component. Two HLDs 45 made of Velcro material with self-adhesive backing hold the HDD to the two spacers 60. A typical hosted device 40 has a block-like shape with six housing faces: a top, bottom, and four sides. The top and bottom are major faces, two relatively longer sides are intermediate faces, and two relatively shorter sides are minor faces. For protecting a hosted element configured similarly to a typical fixed disk drive as shown in FIG. 1, HLDs are configured to fit the shape of the intermediate faces of the HDD. No screw is used. Velcro serves as a fastener as well as damping device. In an embodiment of the invention, HLDs can be fastened to any portion of the hosted element 40.

The music player housing 5 is made of top case 20, rubber insert 10, bottom case 85 and rubber insert 100. The rubber/elstomer inserts for the two cases protect the edges of the housing as well as absorb some energy. The inserts are optional and can be molded or transfer molded. A 70 dm material is desirable for this material.

The rubber/elastomer inserts 10 and 100 reduce the transmitted shocks to the inside case and in turn reduce the transmitted shock to the hosted device 40. The inserts form a permanent part of housing 5 and provide a protective function during handling and installation. They provide multi-axis shock protection.

Other components of the portable music player are the PCBA 30 comprising of the circuit board which supports LCD 32, Head phone plug 34, Record switch 36, volume/select switch 33, power plug 29, docking plug 23, USB port 24, and switches which engage with front buttons. etc. Two screws 28 hold the top case 20 and bottom case 85 together. The plugs 27 close the screw holes in the top case 20.

In another operating environment, one or more units are installed in docking devices instead of portable or table top use. Then it becomes part of a music station.

Still other operating environments include desktop computers and rack systems. In desktop computers, disk drives are placed in 5.25 inch slots. There are external portable devices to help store digital information. A music player can serve this purpose because it actually stores digital information.

FIGS. 13a, 13b and 13c show in detail the construction of a Velcro material used to make the HLD shown in FIG. 12.

The effectiveness of the HLD was tested using a music player 5 containing a 2.5 inch HDD. A drop tester was designed and built. Standard shock/vibration measuring instruments were used. The player was tested before and after the drop. It survived and played after a fall of 30 inches.

The first failure mode of a disk drive is due to head-slap caused by lift off and subsequent drop of the magnetic transducer that is suspended on a spring lever above the surface of the recording media. Head-slap damages either the magnetic transducer or the recording media. Damage to the recording media generates debris that will later result in the magnetic transducer "crashing" onto the recording media. The shock at which head-slap occurs defines the upper limit acceptable for the shock transmitted to a hosted hard disk drive 40. The arrangement and design of the HLDs is critical in the axis in which the head will lift off the media because the transmitted shock has to be reduced to less than the upper limit acceptable to the hosted hard disk drive 40. The overall benefit of the HLDs is to limit the deceleration experienced by the hard disk drive 40 to less than 200 G. This is the usual shock limit specification for currently available hard disk drives. Deceleration amplitudes below this limit do not result in head-slap. The two HLDs used are sufficient for controlling the damage due to a drop on a hard surface from 30 inch height.

The second failure mode for shock to a disk drive involves the positioner for the magnetic transducer moving from the "landing area" onto the recording area of the media. Special features of the "landing area" prevent the head from sticking to the magnetic media when the disks are not spinning. The disk drive contains a latch assembly to prevent positioner motion unless the disks are spinning. With large rotational shock on the same axis as the axis of rotation for the positioner, the latch will fail. The Hook and Loop Devices are most effective for rotational shock because the transmitted shock is reduced to a lower level than possible with prior known devices.

The foregoing is considered as illustrative only of the principles of the invention. Other embodiments are possible. In principle, the hook and loop device can be used for any application requiring cushioning, and control of shock and/or vibration. For example, the hook and loop device can be used for helmets and packaging. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. An apparatus, comprising:
    a disc drive disposed within and spaced apart from a case, wherein the disc drive is displaced from and has opposed sides coupled to the case via a shock attenuating interface, said interface having hook and loop structures oriented so as not to be parallel to a plane in which the disc drive rotates a disc, to minimize shock and vibration of the a disc drive.

2. The apparatus of claim 1, wherein said case has opposed sides coupled to respective ones of the opposed sides of the disc drive via said hook and loop structures.

3. The apparatus of claim 1, wherein said hook and loop structures releasably secure the disc drive within said case while enabling non-destructive removal of the disc drive from said case.

4. The apparatus of claim 1, wherein said apparatus further includes a housing, and shock absorbing inserts; said case being supported within said housing, and said shock absorbing inserts being positioned on the outer periphery of said housing.

5. The apparatus of claim 4, wherein said at least one hook and loop structures releasably secure the disc drive within said case while enabling non-destructive removal of the disc drive from said case.

6. A method, comprising:
    subjecting a device to an external force, the device comprising a disc drive disposed within and spaced apart from a case, wherein the disc drive has opposite sides that are coupled to the case via hook and loop structures oriented so as not to be parallel to a plane in which the disc drive rotates a disc; and reducing transmission of said external force to said a disc drive via absorption of mechanical energy in a sliding motion action of hooks with respect to paired loops of the hook and loop structures.

7. The method of claim 6, further including configuring said at least one hook and loop device to releasably secure the disc drive within said case while enabling non-destructive removal of the disc drive from said case.

8. The method of claim 6, further including disposing said case within a housing, and positioning shock absorbing inserts on an outer periphery of said housing.

9. The method of claim 8, further including configuring said hook and loop structures to releasably secure the disc drive within said case while enabling non-destructive removal of the disc drive from said case.

10. An apparatus, comprising:
a housing;
a disc drive; and
a shock absorber configured to releasably secure said disc drive in said housing, said shock absorber including hook and loop structures oriented so as not to be parallel to a plane in which the disc drive rotates a disc, and positioned within said housing to absorb shock by sliding motion action of the media.

* * * * *